(12) United States Patent
Owechko

(10) Patent No.: US 8,195,591 B1
(45) Date of Patent: Jun. 5, 2012

(54) COGNITIVE SIGNAL PROCESSING SYSTEM

(75) Inventor: Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 192 days.

(21) Appl. No.: 12/788,229

(22) Filed: May 26, 2010

Related U.S. Application Data

(60) Division of application No. 11/800,265, filed on May 3, 2007, now Pat. No. 7,778,950, which is a continuation-in-part of application No. 10/918,336, filed on Aug. 14, 2004, now Pat. No. 7,636,700.

(51) Int. Cl.
*G06F 17/00* (2006.01)
*G06N 5/00* (2006.01)
(52) U.S. Cl. ......................................................... 706/45
(58) Field of Classification Search ...................... 706/45
See application file for complete search history.

(56) References Cited

U.S. PATENT DOCUMENTS

| | | |
|---|---|---|
| 7,558,762 B2 | 7/2009 | Owechko et al. |
| 7,672,911 B2 | 3/2010 | Owechko et al. |
| 2005/0114079 A1* | 5/2005 | Rui et al. ...................... 702/179 |

OTHER PUBLICATIONS

Ross, James. "An Instructible Agent to Assist Man-In-The-Loop Threat Assessment" isif.org, 2001. [Online] Downloaded Jan. 12, 2012. http://isif.org/fusion/proceedings/fusion01CD/fusion/searchengine/pdf/ThC34.pdf.*

Sudharman, Jayaweera, "Bayesian Fusion Performance and System Optimization for Distributed Stochastic Gaussian Signal Detection under Communication Constraints".*
Khosla, D., Moore, C., and Chelian, S. (2007). A Bioinspired system for spatio-temporal recognition in static and video imagery. Proceedings of SPIE, 6560: 656002.
Judea Pearl, et al., "Bayesian Networks," Handbook of Brain Theory and Neural Networks, Technical Report, R-277, Nov. 2000.
Avrim Blum (1996), "On-Line Algorithms in Machine Learning", in Proceedings of the Workshop on On-Line Algorithms.
D. Nister and H. Stewenius, "Scalable recognition with a vocabulary tree," in Proc. CVPR , vol. 5, 2006.
S. Medasani and R. Krishnapuram, "Graph Matching by Relaxation of fuzzy assignments," IEEE Transactions on Fuzzy Systems, 9(1), 173-183, Feb. 2001.
R. Krishnapuram, S. Medasani, S. Jung and Y. Choi, "Content-Based Image Retrieval Based on a Fuzzy Approach," IEEE Transactions on Knowledge and Data Engineering (TKDE), Oct. 2004.
N. Oliver and A. Pentland, "Graphical models for driver behavior recognition in a smart car," Proc. Of IV2000.

(Continued)

*Primary Examiner* — Kakali Chaki
*Assistant Examiner* — Ben Rifkin
(74) *Attorney, Agent, or Firm* — Tope-McKay & Assoc.

(57) ABSTRACT

Described is a signal processing system. The system comprises a signal processing module having signal processing parameters and being configured to receive a plurality of signals. The signal processing module uses the signal processing parameters to output a processed signal, as either a fused signal or a plurality of separate signals. A classification module is included to recognize information encoded in the processed signal to classify the information encoded in the process signal, with the classification having a confidence level. An optimization module is configured, in a feedback loop, to utilize the information encoded in the processed signal to adjust the signal processing parameters to optimize the confidence level of the classification, thereby optimizing an output of the signal processing module.

9 Claims, 19 Drawing Sheets

OTHER PUBLICATIONS

K. Sato and J.K. Aggarwal, "Temporal spatio-velocity transform and its application to tracking and interaction," CVIU 96(2004), 100-128.
S. Hongeng, R. Nevatia, and F. Bremond, "Vide-based event recognition: activity representation and probabilistic recognition methods," CVIU 96(2004), 129-162.
Medioni, I. Cohen, F. Bremond, S. Hongeng, R. Nevatia, "Event detection and analysis from video streams," IEEE PAMI 23(8), 2001, 873-889.
N. Oliver, A. Garg, and E. Horvitz, "Layered representations for learning and inferring office activity from multiple sensory channels," CVIU 96(2004), 163-180.
A. Amir, S. Basu, G. Iyengar, C. Lin, M. Naphade, J.R. Smith, S. Srinivasa, and B. Tseng, "A multi-modal system for retrieval of semantic video events," CVIU 96(2004), 216-236.
R.T. Collins, A. J. Lipton, and T. Kanade, "Introduction to the special section on video surveillance," IEEE-PAMI, 22(8), Aug. 2000.
N. Oliver, B. Rosario, and A. Pentland, "A Bayesian computer vision system for moceling human interactions," IEEE-PAMI, 22(8), Aug. 2000.
J.C. Bezdek, Pattern Recognition with Fuzzy Objective Function Algorithms, Plenum Press, New York, 1981.
M.P. Windham, "Numerical classification of proximity data with assignment measure," Journal of Classification, vol. 2, pp. 157-172, 1985.
S. Gold and A. Rangarajan, "A graduated assignment algorithm for graph matching," IEEE Transaction on Pattern Analysis and Machine Intelligence, vol. 18, pp. 377-387, Apr. 1996.
Z. Zhang, "A flexible new technique for camera calibration," IEEE Transactions on Pattern Analysis and Machine Intelligence, 22(11): 1330-1334, 2000.
Jean-Yves Bouguet, "Camera Calibration Toolbox for Matlab," http://www.vision.caltech.edu/bouguetj/calib_doc/.
Intel OpenCV Computer Vision Library (C++), http://www.intel.com/research/mrl/research/opencv/.
Giorgio Carpaneto, Paolo Toth, "Algorithm 548: Solution of the assignment problem [H]," ACM Transactions on Mathematical Software, 6(1): 104-111, 1980.
I. Hartley, A. Zisserman, "Multiple view geometry in computer vision," Cambridge University Press, Cambridge, UK 2000.
Longuet-Higgins, "A computer algorithm for reconstructing a scene from two projections" Nature, 293: 133-135, Sep. 1981.
T. Kailath, et al., "Linear Estimation," Prentice Hall, NJ, ISBN 0-13-022464-2, 854pp, 2000.
P. Saisan, "Modeling of Pedestrian Motion for recognition," IS&T/SPIE 17th annual symposium, San Jose, CA 2005.
A.R. Dick, et al., "Combining Single view recognition and multiple view stereo for architectural scenes," International Conference on Computer Vision (ICCV'01) vol. 1, Jul. 7-14, 2001, Vancouver, B.C., Canada.
G. Shakhanarovich, et al. "Integrated face and gait recognition from multiple views," In Proceedings of the IEEE Conference on Computer Vision and Pattern Recognition, Dec. 2001, Kauai, Hawaii.
Sujit Kuthirummal, et al., "Planar shape recognition across multiple views," In Proceedings of the Interationa Conference on Pattern Recognition (ICPR)—2002, Quebec, Canada.
Sujit Kuthirummal, et al., "Multiview constraints for recognition of planar curves in fourier domain," Proceedings of the Indian Conference on Vision Graphics and Image Processing (ICVGIP)—2002.
A. Selinger and R.C. Nelson, "Appearance-based object recognition using multiple views," In Proceedings of the IEEE Conference on Computer Vision and Pattern Recognition—Dec. 2001, Kauai, Hawaii.
D.L. Swats, et al., "Genetics Algorithms for Object Recognition in a complex scene," Proc. Of Intl. Conference on Image Processing, vol. 2, Oct, pp. 23-26, 1995.
V. Ciesielski and M. Zhang, "Using Genetic Algorithms to Improve the Accuracy of Object Detection," In Proceedings of the third Pacific-Asia Knowledge Discovery and Data Mining Conference, Ning Zhong and Lizhu Zhou (Eds.), Knowledge Discovery and Data Mining—Research and Practical Experiences. Tsinghua University Press, p. 19-24. Beijing, China, Apr. 26-31, 1999.
Kennedy, J., et al., "Swarm intelligence," San Francisco: Morgan Kaufmann Publishers, 2001.
R.C. Eberhart, et al., "Particle swarm optimization: Developments, applications, and resources," Proceedings of IEEE Congress on Evolutionary Computation (CEC 2001), Korea, 2001.
R. Brits, et al., "A Niching Particle Swarm Optimizer," 2002.
F. Rojas, I. Rojas, R. M. Clemente, and C.G. Puntoner, "Nonlinear blind source separation using genetic algorithms," in Proceedings of International Conference on Independent Component Analysis, 2001.
D. Beasley, D. R. Bull, and R. R. Martin, "A Sequential Niching Technique for Multimodal Function Optimization," Evolutionary Computation, 1(2), p. 101-125, 1993.
R. Krishnapuram and J. M. Keller, "Quantative Analysis of Properties and Spatial Relations of Fuzzy Image Regions," Transactions on Fuzzy Systems, 1(2):98-110, 1993.
Y. Owechko, S. Medasani, and N. Srinivasa, "Classifier Swarms for Human Detection in infrared imagery," Proc. Of the CVPR workshop on Object Tracking and Classification Beyond the Visible Spectrum (OTCBVS'04) 2004.
Y. Owechko, et al., "Vision-Based Fusion System for Smart Airbag Applications," Intelligent Vehicle Symposium, 2002. IEEE, Publication Date: Jun. 17-21, 2002, vol. 1, On pp. 245-250 vol. 1.
Y. Owechko and S. Medasani, "A Swarm-based Volition/Attention Framework for Object Recognition," IEEE Conference on Computer Vision and Pattern Recognition, San Diego, Proc. Of CVPR-WAPCV 2005.
Y. Owechko and S. Medasani, "Cognitive Swarms for Rapid Detection of Objects and Associations in Visual Imagery," IEEE Swarm Intelligence Symposium, Pasadena, 2005.
P. Saisan, S. Medasani, and Y. Owechko "Multi-View Classifier Swarms for Pedestrian Detection and Tracking," IEEE Conference on Computer Vision and Pattern Recognition, San Diego, 2005.
N. Srinivasa, et al., "Fuzzy edge-symmetry features for enhanced intruder detection," 11th International Conference on Fuzzy Systems, FUZZIEEE 2003.
F. Orabona, G. Metta, and G. Sandini, "Object-based Visual Attention: A Model for a Behaving Robot," in 3rd International Workshop on Attention and Performance in Computational Vision (in CVPR 2005), San Diego, CA, Jun. 2005.
B. J. Scholl, "Objects and Attention: The State of the Art," Cognition 80: 1-46, 2001.
Y. Sun and R. Fisher, "Hierarchical Selectivity for Object-based Visual Attention," submitted to Artificial Intelligence, 2004.
Liao, Wenhul and Ji, Qiang 2006, "Efficient Active Fusion for Decision-making via VOI Approximation," in Proc. AAAI 2006, 1180-1185.
Jaynes, C., Stolle, F., and Collins, R., "Task Driven Perceptual Organization for Extraction of Roofop Polygons," Proceedings of the ARPA Image Understanding Workshop, Monterey, California (Morgan Kaufmann Publishers, San Francisco, 1994), pp. 359-365.
A. Huertas, and R. Nevatia, "Detecting Changes in Aerial Views of Man-Made Structures," IVC200.
R. Mendes, "The Fully Informed Particle Swarm: Simpler, Maybe Better," Special issue of IEEE Trans. On Evol. Computation on Particle Swarm Optimization, vol. 8, No. 3, Jun. 2004.
K.E. Parsopoulos, et al. "On the Computation of All Global Minimizers Through Particle Swarm Optimization," Special issue of IEEE Trans. On Evol. Computation on Particle Swarm Optimization, vol. 8, No. 3, Jun. 2004.
F. van der Bergh, et al., "A Cooperative Approach to Particle Swarm Optimization," Special issue of IEEE Trans. On Evol. Computation on Particle Swarm Optimization, vol. 8, No. 3, Jun. 2004.
A. Ratnaweera, "Self-Organizing hierarchical particle Swarm Optimizer with Time-Varying Acceleration Coefficients," Special issue of IEEE Trans. On Evol. Computation on Particle Swarm Optimization, vol. 8, No. 3, Jun. 2004.
C.A. Coello, "Handling Multiple Objectives With Particle Swarm Optimization," Special issue of IEEE Trans. On Evol, Computation on Particle Swarm Optimization, vol. 8, No. 3, Jun. 2004.

L. Messerschmidt, et al., "Learning to Play Games Using a PSO-Based Competitive Learning Approach," Special issue of IEEE Trans. On Evol. Computation on Particle Swarm Optimization, vol. 8, No. 3, Jun. 2004.

M.P. Wachwiak, et al., "An Approach to Multimodal Biomedical Image Registration Utilizing Particle Swarm Optimization," Special issue of IEEE Trans. On Evol. Computation on Particle Swarm Optimization, vol. 8, No. 3, Jun. 2004.

R. Hassan, B. Cohanim, and O. de Weck, "A Comparison of Particle Swarm Optimization and the Genetic Algorithm," AIAA Conference, 2005.

J.F. Schutte, J.A. Reinbolt, B.J. Fregly, R.T. Haftka, and A.D. George, "Parallel Global Optimization with the Particle Swarm Algorithm," Int. J. Numerical methods in Engineering, 61: 2296-2315, 2004.

J. Kennedy and W.M. Spears, "Matching Algorithms to Problems: an Experimental Test of the Particle Swarm and Some Genetic Algorithms on the Multimodal Problem Generator," Proceedings of IEEE Inter. Conf. on Evolutionary Computation, 78-83, 1998.

Bradski, G. And S. Grossberg (1995), "Fast learning VIEWNET architectures for recognizing 3-D objects from multiple 2-D views," Neural Networks 8, 1053-1080.

Charniak, E. (1991), "Bayesian networks without tears," AI Magazine 12, 50-63.

Hu, W., D. Xie, et al. (2004), "Learning activity patterns using fuzzy self-organizing neural network," IEEE Transactions on Systems, Man, and Cybernetics—Part B: Cybernetics 34, 1618-1626.

Lazebnik, S., C. Schmid, et al. (2006), "Beyond bags of features: Spatial pyramid matching for recognizing natural scene categories," IEEE Conference on Computer Vision and Pattern Recognition, New York, NY.

Lowe, D. (1999), "Object recognition from local scale-invariant features," International Conference on Computer Vision, Corfu, Greece.

Medasani, S. and Y. Owechko (2007), "Behavior recognition using cognitive swarms and fuzzy graphs," SPIE Defense and Security Symposium, Orlando, FL.

S. Medasani, and Y. Owechko, "Possibilistic Particle Swarms for Optimization," Proceedings 5673 of SPIE/IST Symposium on Electronic Imaging, San Jose, 2005.

Park, S. and J. Aggarwal (2003), "A hierarchical Bayesian network for event recognition of human actions and interactions," ACM SIGMM International Workshop on Video Surveillance, Berkely, CA.

Barbara Zitova and Jan Flusser, "Image registration methods: a survey," Image and Vision Computing 21, pp. 977-1000, 2003.

B. Bhanu, et al., "Adaptive Image Segmentation Using a Genetic Algorithm," IEEE Transactions on Systems, Man, and Cybernetics, vol. 25, No. 12, Dec. 1995.

Office action from U.S. Appl. No. 10/918,336.
Notice of Allowability for U.S. Appl. No. 11/367,755.
Notice of Allowability for U.S. Appl. No. 11/385,983.
Notice of Allowability for U.S. Appl. No. 11/433,159.
Reply to Notice of Allowance for U.S. Appl. No. 11/433,159.
Notice of Allowability for U.S. Appl. No. 10/918,336.
Notice of Allowability for U.S. Appl. No. 11/800,265.

* cited by examiner

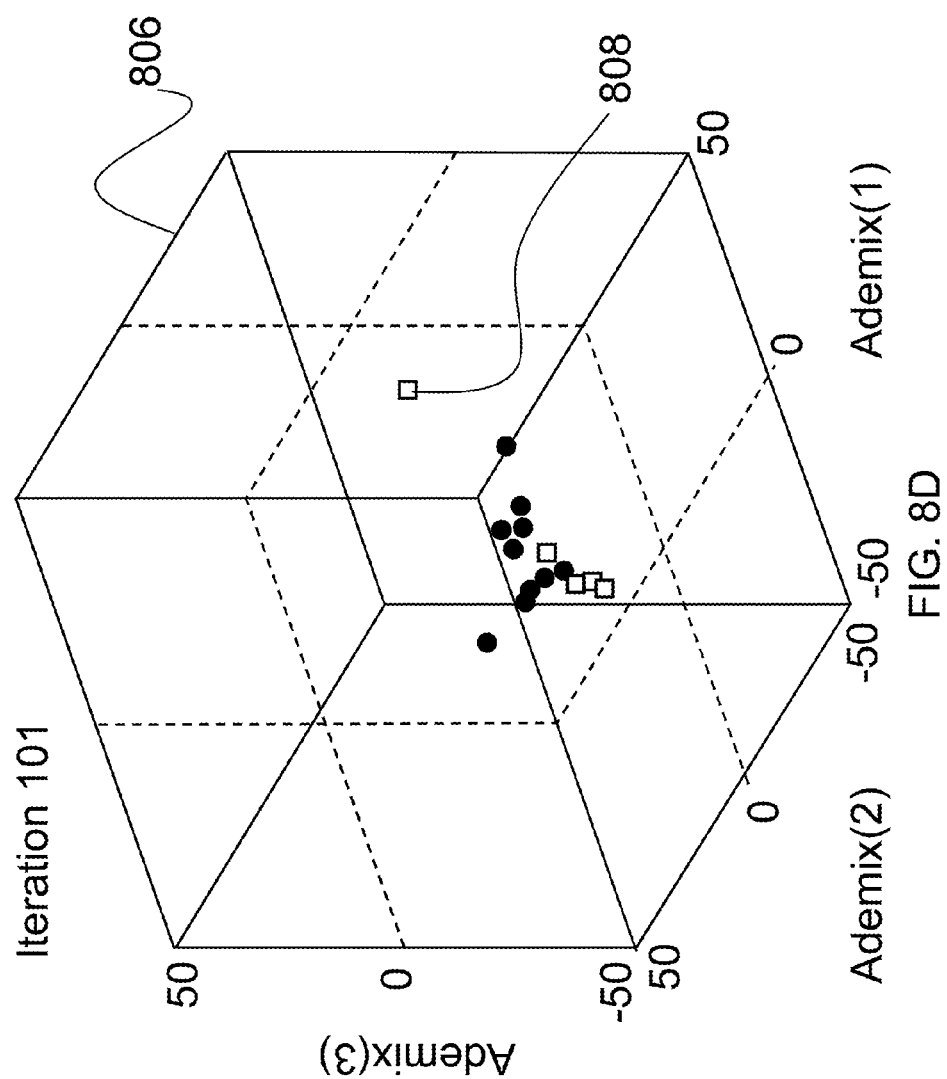

COGNITIVE SIGNAL PROCESSING SYSTEM

PRIORITY CLAIM

This patent application is a Divisional application of U.S. Non-Provisional patent application Ser. No. 11/800,265, filed on May 3, 2007, entitled, "Cognitive Signal Separation and Classification System", which is a Continuation-In-Part application of U.S. Non-Provisional patent application Ser. No. 10/918,336, filed on Aug. 14, 2004, entitled, "Object Recognition System Incorporating Swarming Domain Classifiers", now issued as U.S. Pat. No. 7,636,700.

FIELD OF INVENTION

The present invention relates to a signal processing system and, more particularly, to a cognitive signal processing system for extracting and fusing signals from a plurality of signals that uses information encoded within the signals.

BACKGROUND OF INVENTION

When multiple signals are present, it is often desirable to separate the signals. For example, a microphone may pick up speech signals from multiple individuals, thereby generating a mixed signal. However, one skilled in the art can imagine scenarios where it may be desirable to extract a single user's speech from the mixed signal.

Previous approaches to extracting signals from mixtures without knowledge of how the mixtures were formed, otherwise known as blind source separation (BSS), have all been based on measuring and adjusting the low-level properties of the output signals themselves (such as the statistics of the signal waveforms). The prior art approach for blindly separating signals from mixtures gathered using multiple sensors is shown in FIG. 1. It is a feed-forward architecture in which various BSS methods, such as independent component analysis (ICA) or the constant modulus algorithm, are used to extract signals from mixtures using the low-level statistical properties of the signals. These statistical properties can include statistical independence, kurtosis, sparsity, constant modulus, and other signal-level properties. For example, ICA extracts signals from mixtures by maximizing the statistical independence of the outputs. Alternatively, a constant modulus algorithm assumes the source signals have a constant modulus and extracts signals by forcing the outputs to have a constant modulus.

Relying on such low-level properties of the signals for signal-extraction has several disadvantages. Long signal lengths are required in order to accurately estimate the signal properties. Additionally, many conventional BSS algorithms are based on gradient descent, which relies on good continuous estimates of the signal properties. Therefore, BSS methods have difficulty in following fast changes in the mixing channels. Many conventional BSS algorithms assume certain properties of the signals which are not found in practice or severely limit the range of signals that can be handled.

BSS based on signal statistics has been successfully applied in a number of applications, such as blind antenna beamforming and removal of interference from speech signals. However, the quality of the signal separation is limited by the accuracy of the estimates of the signal statistics. In many cases, high accuracy requires the collection and processing of large amounts of signal data. This results in slow update rates that may not follow rapid changes in the mixtures due both to the processing requirements and the need for long signal lengths for good statistics.

BSS was further described by F. Rojas, I. Rojas, R. M. Clemente, and C. G. Puntoner, in a paper entitled, "Nonlinear Blind Source Separation Using Genetic Algorithms." The paper was published in Proceedings of International Conference on Independent Component Analysis, 2001. In the aforementioned paper, the authors describe using genetic algorithms to separate signals. However, their method is based on the low-level statistical properties of the signals (statistical moments), not on the cognitive information encoded in the signals.

While cognitive information exists in the signals, no known prior art extracts the signals based on the cognitive information encoded in the signals. In cognitive signal separation, signals can be extracted based on the performance of a higher-level system that actually recognizes and uses the cognitive information in the signal. Such a system would greatly increase the range of signals that can be processed and improve system performance because the signal-extraction is tied to the end performance of the system, not to artificially-selected low-level properties of the signals that may be irrelevant to the top-level end-user of the cognitive information contained in the signals. For example, ICA will fail if the source signal statistics are too close to Gaussian because the higher-order moments will be too small and noisy. Cognitive signal separation is blind to the low-level signal statistics so it can handle such a case. As opposed to BSS systems, a cognitive-based system does not require gradient information or continuity in the classifier confidence as a function of extraction parameters. A cognitive-based system can also be adapted to handle nonlinear and convolutive mixtures of signals.

As described above, the prior art extracts signals by measuring and adjusting the low-level properties of the output signals themselves as opposed to using the higher-level information encoded in the source signals. Thus, a continuing need exists for a cognitive-based system that allows a user to process signals using higher-level information encoded in the source signals themselves.

SUMMARY OF INVENTION

The present invention relates to a cognitive signal processing system for processing signal mixtures. The system comprises a signal processing module, a classification module, and an optimization module. The signal processing module includes signal processing parameters and is configured to receive a plurality of signals and use the signal processing parameters to output a processed signal. The classification module is configured to receive the processed signal and recognize information encoded in the processed signal to classify the information encoded in the process signal. The classification is generated with a confidence level. The optimization module is configured, in a feedback loop, to utilize the information encoded in the processed signal to adjust the signal processing parameters and optimize the confidence level of the classification, thereby optimizing an output of the processed signal.

In another aspect, upon the classifier confidence level reaching a predetermined threshold, the signal processing module is configured to output the processed signal.

In yet another aspect, the optimization module is configured to identify the signal processing parameters that optimize the confidence level of the classification using a technique selected from a group consisting of a genetic algorithm, particle swarm optimization, and an optimization algorithm.

Additionally, the signal processing module is a signal-extraction module and the signal processing parameters are a set of signal-extraction parameters. The signal-extraction module is further configured to receive a signal mixture having a plurality of signals and use the signal-extraction parameters to demix the signals to output the plurality of signals as separate signals. The classification module is further configured to receive the separate signals and recognize information encoded in each of the separate signals to classify the information encoded in each of the separate signals, with each classification having a confidence level. The optimization module is further configured, in a feedback loop, to utilize the information encoded in each of the separate signals to adjust the set of signal-extraction parameters to optimize the confidence levels of the classifications, thereby optimizing a demixing of the plurality of signals as separate signals.

In another aspect, upon the classifier confidence level reaching a predetermined threshold, the classification module is configured to output the classifications for each separate signal.

In yet another aspect, the signal-extraction module is configured to utilize a technique selected from a group consisting of a demixing matrix, a filter, a de-convolution matrix, a non-linear vector operation. The technique is operable to demix the signals to output the plurality of signals as separate signals.

Additionally, the signal-extraction module is further configured to receive a plurality of signal mixtures, each having a plurality of signals. The signal-extraction module is further configured to process the signal mixtures in order to demix the signal mixtures using the signal-extraction parameters and output the plurality of signals as separate signals.

In another aspect, the classification module is a speech recognition system that is configured to receive the separate signals and recognize the separate signals as speech and to classify words in the speech, with each classification having a confidence level.

In another aspect, the signal processing module is a signal fusion module and the signal processing parameters are a set of signal fusion parameters. The signal fusion module is further configured to receive a plurality of signals and use the signal fusion parameters to fuse the signals to output a fused signal. In this aspect, the classification module is further configured to receive the fused signal and recognize information encoded in the fused signal to classify the information encoded in the fused signal, with the classification having a confidence level. Furthermore, the optimization module is further configured in a feedback loop to utilize the information encoded in the fused signal to adjust the set of signal fusion parameters to optimize the confidence level of the classification, thereby optimizing a fusion of the plurality of signals as a fused signal.

Finally, as can be appreciated by one skilled in the art, the present invention also comprises a computer program product and a computer-implemented method. The computer program product comprises computer-readable instruction means stored on a non-transitory computer-readable medium that are executable by a computer for causing the computer to perform the operations described herein. Additionally, the method comprises acts of causing a data processor to perform a plurality of operations. The acts comprise the operations of the signal processing system according to the present invention.

BRIEF DESCRIPTION OF THE DRAWINGS

The objects, features, and advantages of the present invention will be apparent from the following detailed descriptions of the various aspects of the invention in conjunction with reference to the following drawings, where:

FIG. 8D is a graph illustrating the PSO swarm states of FIG. 8B in a 3D demixing parameter space, with the best solutions of the previous iterations being plotted as squares;

DETAILED DESCRIPTION

Figure 1:
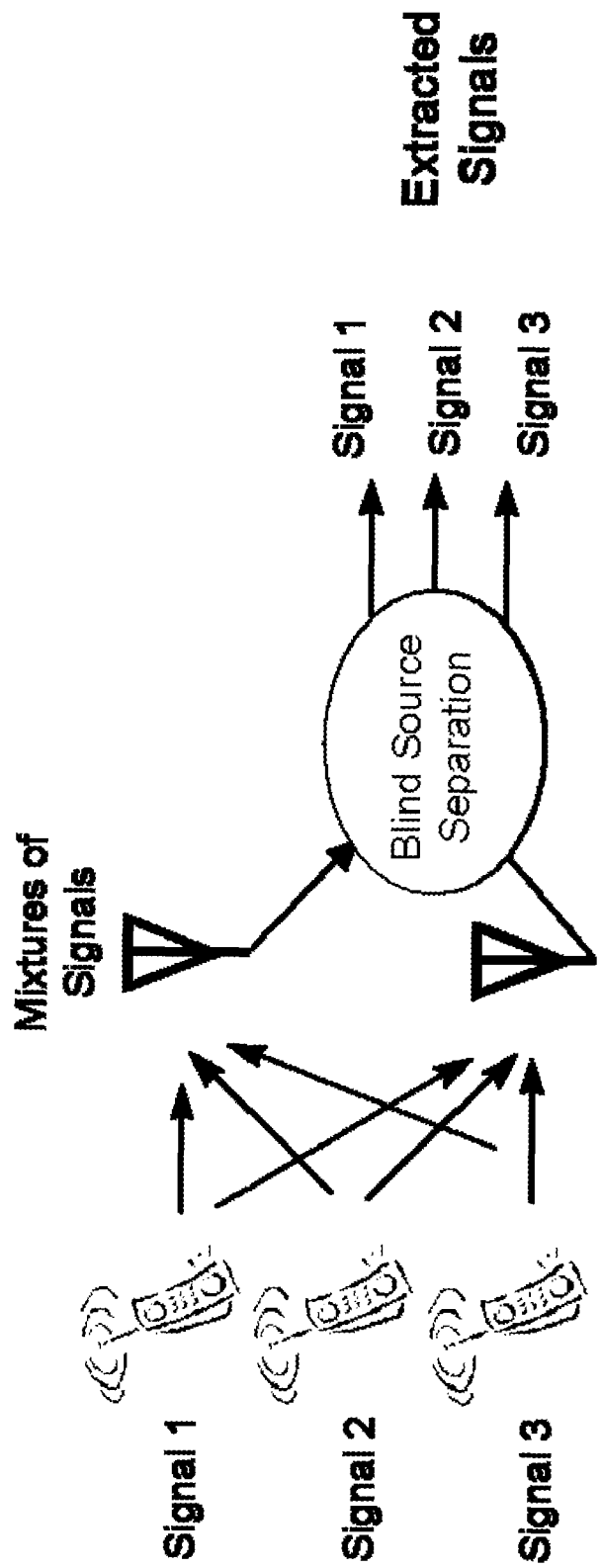
FIG. 1 is a flow chart illustrating a method of the prior art for signal separation, where conventional blind source separation (BSS) methods are used separate signals using low-level properties of the signals themselves.

The present invention relates to a signal processing system and, more particularly, to a cognitive signal processing system for extracting and fusing signals from a plurality of signals that uses information encoded within the signals. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a glossary of terms used in the description and claims is provided. Next, a description of various principal aspects of the present invention is provided. Subsequently, an introduction provides the reader with a general understanding of the present invention. Finally, details of the present invention are provided to give an understanding of the specific aspects.

(1) Glossary

Before describing the specific details of the present invention, a glossary is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

(2) Principal Aspects

The present invention has three "principal" aspects. The first is a cognitive signal processing system. The cognitive signal processing system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 2:
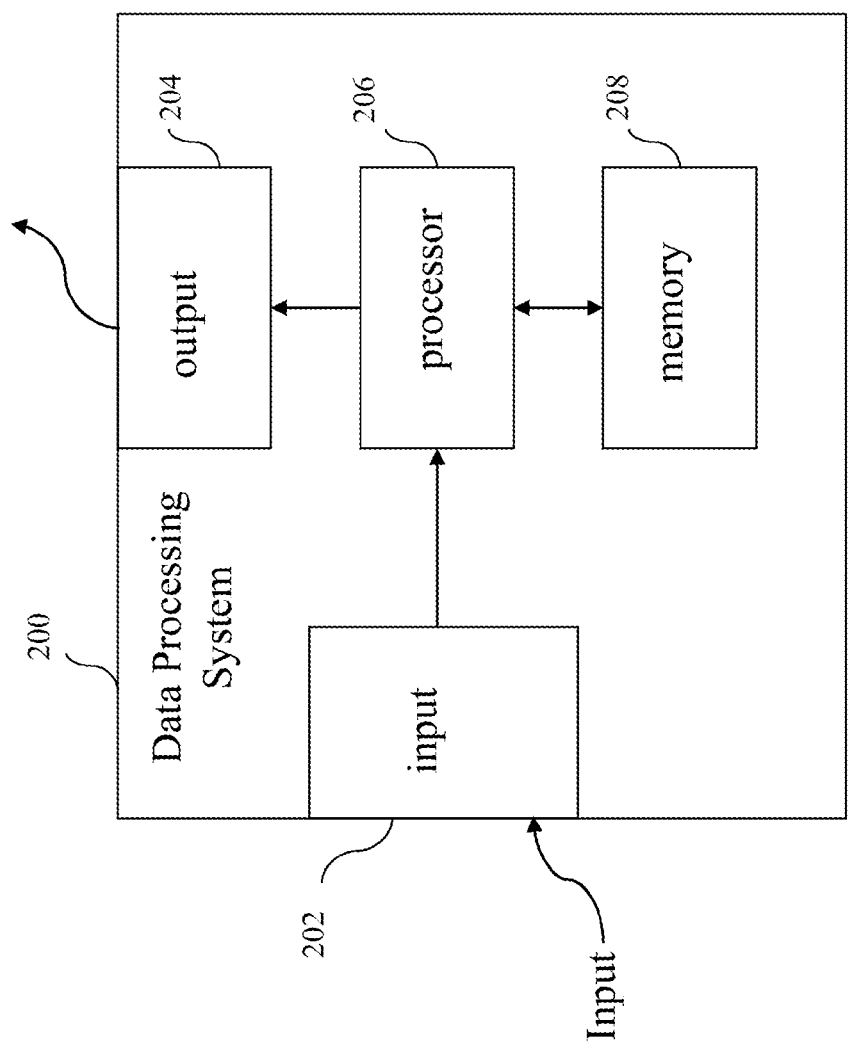
FIG. 2 is a block diagram depicting the components of a cognitive signal processing system of the present invention.

A block diagram depicting the components of a cognitive signal separation system of the present invention is provided in FIG. 2. The cognitive signal separation system 200 comprises an input 202 for receiving information from at least one sensor for use in receiving the signals. Note that the input 202 may include multiple "ports." Typically, input is received from at least one sensor, non-limiting examples of which include video image sensors and audio sensors (e.g., microphone). An output 204 is connected with the processor for providing information regarding the signals to other systems in order that a network of computer systems may serve as an image processing system. Output may also be provided to other devices or other programs; e.g., to other software modules, for use therein. The input 202 and the output 204 are both coupled with a processor 206, which may be a general-purpose computer processor or a specialized processor designed specifically for use with the present invention. The processor 206 is coupled with a memory 208 to permit storage of data and software that are to be manipulated by commands to the processor 206.

Figure 3:
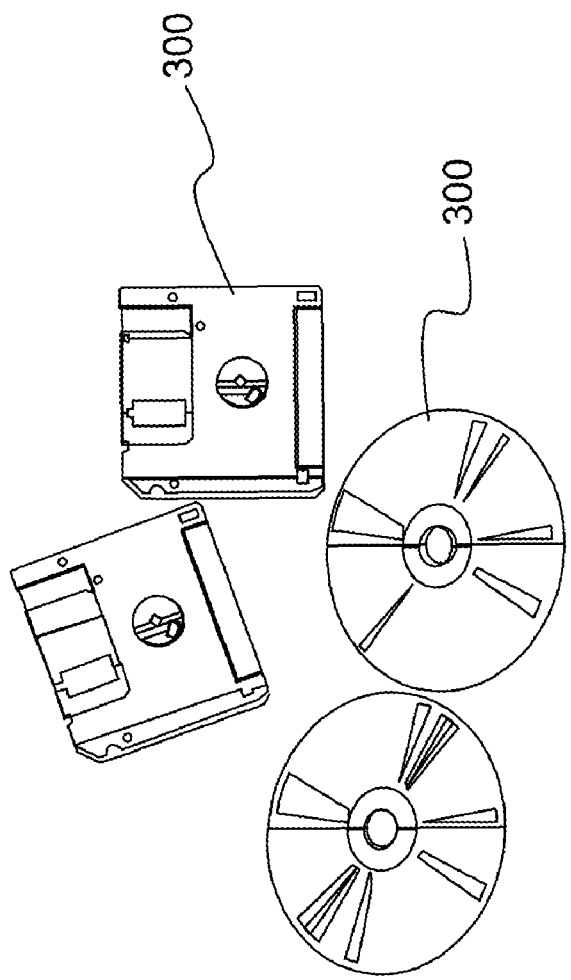
FIG. 3 is an illustration of a computer program product embodying the present invention.

An illustrative diagram of a computer program product embodying the present invention is depicted in FIG. 3. The computer program product 300 is depicted as an optical disk such as a CD or DVD. However, as mentioned previously, the computer program product generally represents computer-readable instructions stored on any compatible computer-readable medium.

(3) Introduction

The present invention is a cognitive signal processing system. More specifically, the present invention is a cognitive signal separation and fusion system. The invention comprises a system for extracting signals from mixtures that uses an optimization framework to maximize the confidence level of a classifier. As used herein, the term "signals" refers to both conventional time-series signals and higher dimensional data objects such as images. The mixtures are formed using multiple sensors, each of which detects the same set of signals. The classifier recognizes signals that are members of specific classes. For example, the classifier could be a speech recognition system that recognizes spoken words, or it could be a computer vision system that recognizes specific types of objects in visual scenes. By adjusting parameters in a signal-extraction stage, the optimization framework maximizes the classifier confidence and extracts recognizable signals hidden in the mixtures. A unique approach of the present invention is the use of classifier and optimizer stages in a feedback loop to the signal-extraction stage in order to extract signals from the signal mixtures without any knowledge of how the mixtures were formed. Instead of extracting signals from mixtures based on low-level properties of the signals, as is done in conventional approaches, the present invention uses higher-level or cognitive information encoded in the signals, such as words or objects, which the classifier recognizes in the extracted signals.

The same framework comprising a classifier and optimizer in a feedback loop can also be used for signal fusion by replacing the signal-extraction stage with a signal fusion (combiner) stage. The invention can then combine multiple signals using cognitive information by maximizing the classifier confidence.

The present invention has applications in any system that needs to separate noise and interference from signals of interest using sensors (e.g., two or more sensors). It allows signals to be extracted from mixtures of other signals, interference, and noise by exploiting the cognitive information encoded in the signals. Non-limiting examples of such applications include the separation of multiple voices and background noise for speech recognition, acoustic sensor array processing, beamforming for smart antenna arrays, and hyperspectral image processing. For example, the present invention can be used to extract individual voices when multiple people are speaking simultaneously by maximizing the confidence score of a speech recognition system. It can also be used to extract voices from mixtures that are uttering specified keywords.

Further applications include blind-beamforming for uncalibrated antenna arrays. In blind-beamforming for smart antennas, the present invention can be used to adjust the antenna complex weighting coefficients to eliminate interference and focus the beam by maximizing the confidence of a speech recognition system that processes the demodulated signals. The present invention can also be used to perform signal or image fusion with applications in image registration and object recognition.

(4) Details of the Invention

The present invention is a cognitive signal processing system that uses information encodes in the signals to both separate and fuse the signals. Thus, the present invention includes both signal separation (extraction) and signal fusion systems. For clarity, the signal separation system will be described first, with the signal fusion system being described thereafter.

(4.1) Signal Separation (Extraction)

Figure 4:
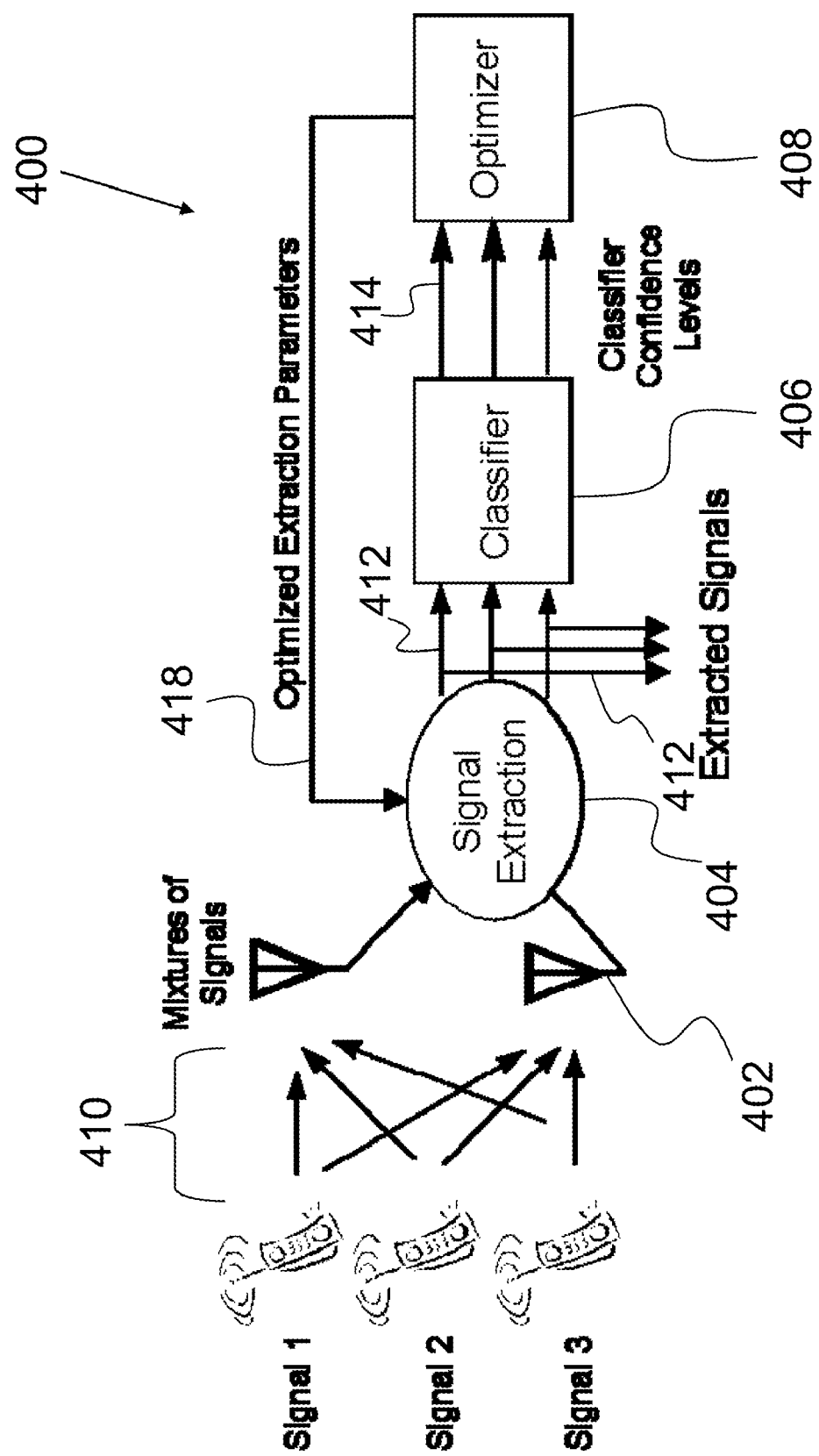
FIG. 4 is a flow chart illustrating a cognitive signal processing system according to the present invention, depicting separation of a mixed signal.

Cognitive signal separation does not separate signals using the statistical properties of the signals themselves. Instead, the separation is based on high-level cognitive information encoded in the signals. As shown in FIG. 4, the signal separation system 400 separates signal mixtures 402 using a signal-extraction module 404 (signal processing module), a classification module 406, and an optimization module 408 in a feedback architecture.

The signal-extraction module 404 is characterized by a set of signal-extraction parameters (signal processing parameters). The signal-extraction module 404 receives the signal mixture 402 having a plurality of signals 410. The signal-extraction module 404 thereafter uses a technique (controlled by the signal-extraction parameters) to demix the signals to output the plurality of signals as separate signals 412 (processed signal). The technique is any suitable technique for demixing a plurality of signals, non-limiting examples of which include using a demixing matrix, a filter or set of filters for handling convolutive mixtures, a de-convolution matrix, and a non-linear vector operation.

The signal-extraction parameters are control parameters used to modify or determine the operation of the techniques listed above. They set the specific behavior of the technique. For example, for the demixing matrix technique, the parameters are the values of the elements of the demixing matrix.

The classification module 406 is used to classify the information encoded within the signal. More specifically, the classification module 406 recognizes higher-level information encoded in the signal, such as words or visual objects. Non-limiting examples of such classification systems include a speech recognition subsystem, a visual object recognition subsystem, or a target recognition subsystem. The output of the classification module 406 is a confidence value that higher-level information has been recognized.

In classifying the signals, the classification module 406 generates a confidence level 414 associated with each classification. The confidence level 414 is used to determine whether or not the signals have been processed with a sufficient degree of accuracy. When the classifier confidence level 414 reaches a predetermined threshold, the signal-extraction module 404 is configured to output the separate signals 412 (processed signal). Alternatively, when the classifier confidence level 414 does not reach the predetermined threshold, the optimization module 408 is used to optimize the signal-extraction parameters for use by the signal-extraction module 404.

The optimization module 408 finds the set of signal-extraction parameters that maximize the confidence of the classification module 406. By so doing, the signal is extracted from the mixture because a clean signal maximizes the classifier confidence. Optimization can be implemented using a variety of techniques, non-limiting examples of which include genetic algorithms, particle swarm optimization, or other optimization algorithms. In cognitive signal separation, unlike the prior art, signals are extracted from mixtures using a classifier/optimizer feedback loop 418 to maximize the confidence level of a classifier. The system finds signals in the mixtures using cognitive information encoded in the signals while ignoring the low-level statistical properties of the signals. Cognitive signal separation is easily extended to nonlinear and convolutive mixtures by optimizing additional signal-extraction parameters which control space-time filters and nonlinear inversion functions.

(4.2) Signal Fusion

Figure 5:
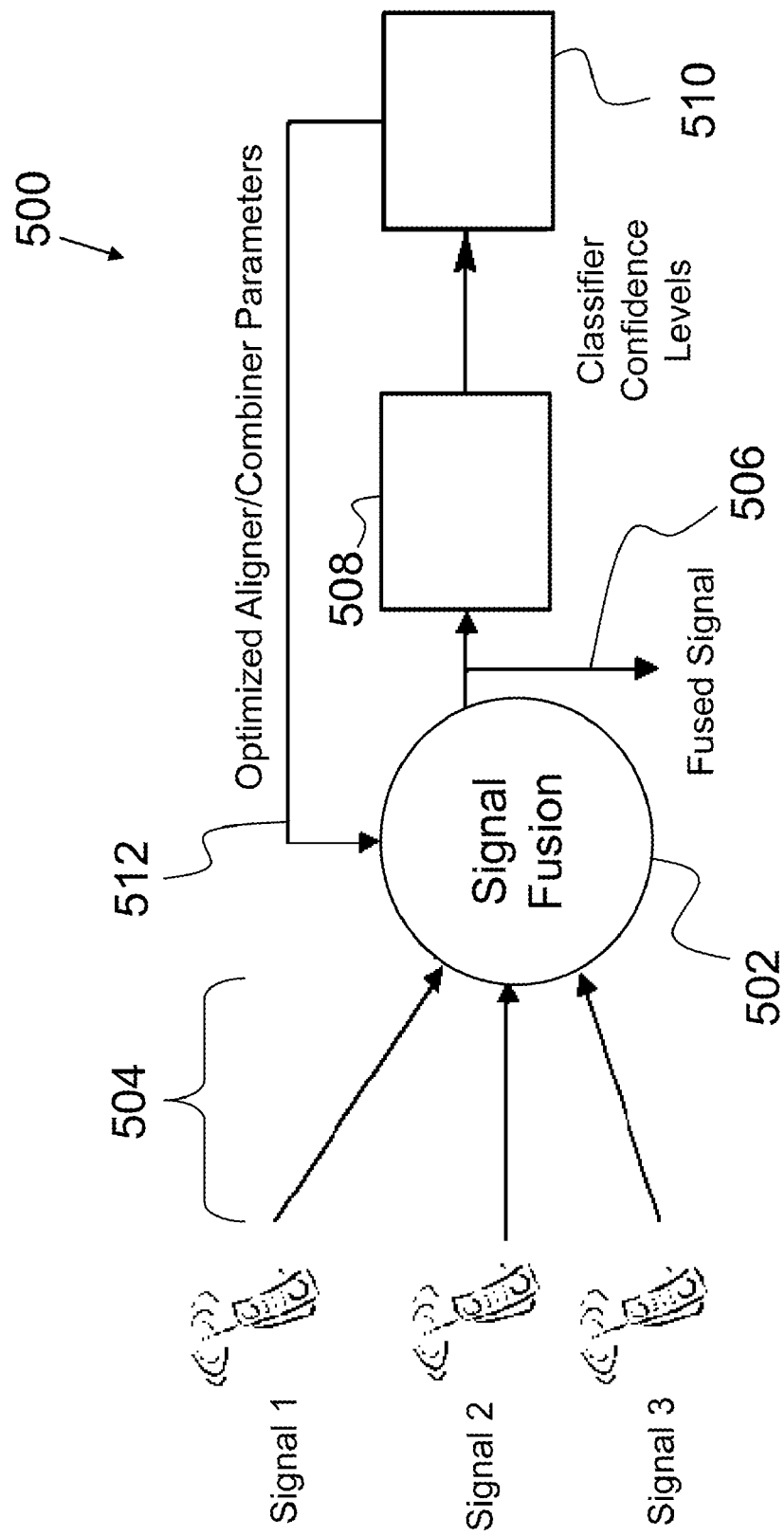
FIG. 5 is a flow chart illustrating a cognitive signal processing system according to the present invention, depicting fusion of a multiple signals.

As mentioned above and as illustrated in FIG. 5, the present invention also includes a signal fusion system 500. In this aspect, the signal processing module is a signal fusion module 502 and the signal processing parameters are a set of signal fusion parameters. The signal fusion module 502 is configured to receive a plurality of signals 504 and use the signal fusion parameters to fuse or align the signals 504 to output a fused signal 506.

Similar to the aspect listed above, the classification module 508 is configured to receive the fused signal 506 and recognize information encoded in the fused signal 506 to classify information encoded in the fused signal (with the classification having a confidence level).

The optimization module 510 is configured (in a classifier/optimizer feedback loop 512) to utilize the information encoded in the fused signal 506 to adjust the set of signal fusion parameters to optimize the confidence level of the classification. In other words, the classifier/optimizer feedback loop 512 can also be used to perform fusion of multiple signals by replacing the signal-extraction stage with a signal aligner/combiner stage.

The classification module 508 modifies the parameters in the signal fusion module 502 to maximize the classifier confidence. The optimization module 510 finds alignments and combinations of signals which maximize recognition by the classification module 508 using cognitive information encoded in the signals while ignoring the low-level statistical properties of the signals. For example, multiple hyperspectral images could be optimally combined for automatic target recognition systems or the best combination of microphones could be automatically updated for optimized speech recognition.

Also, the use of heuristic optimization algorithms such as genetic algorithms or particle swarm optimization as an optimizer (used by the optimization module 510) greatly expands the range of mixing channels that can be handled, since these algorithms only require evaluations of an objective function, which in this case is the classifier confidence.

(5) Experimental Results

The cognitive signal processing system has been implemented and successfully demonstrated using mixtures of images. As described below, the classification module was a pedestrian detection classifier. Additionally, particle swarm optimization (PSO) was used to implement the optimizer. PSO is a population-based evolutionary algorithm which is effective for optimization of a wide range of functions. PSO was first described by U.S. Non-Provisional patent application Ser. No. 10/918,336, filed on Aug. 14, 2004, entitled, "Object Recognition System Incorporating Swarming Domain Classifiers," which is incorporated by reference as though fully set forth herein.

The algorithm models the exploration of multi-dimensional solution space by a "swarm" of moving agents or "particles." The relative success of each particle in finding a good solution has an influence on the dynamics of other members of the swarm. Each particle i keeps track of the position coordinates that are associated with the best solution vector ($p_i$) it has observed so far. Another vector variable ($p_g$) is used to store the global best location found by all particles so far. The velocity of particle i is then changed towards $p_i$ and $p_g$ in a probabilistic way according to the following update equations:

$$\vec{v}_i(t+1) = w\vec{v}_i(t) + c_1 q_1 (\vec{p}_i - \vec{x}_i(t)) + c_2 q_2 (\vec{p}_g - \vec{x}_i(t)),$$

$$\vec{x}_i(t+1) = \vec{x}_i(t) + \vec{v}_i(t+1)$$

where $x^i(t)$ and $v^i(t)$ are the position and velocity vectors at time t of the i-th particle and $c_1$ and $c_2$ are parameters that weight the influence of the local and global terms in the velocity update equation. w is a decay constant which allows the swarm to converge to a solution more quickly. The q function generates a random number between 0 and 1 with a uniform distribution. The above dynamics reflect a socio-psychological model where individual particles change their beliefs in accordance with a combination of their own experience and the best experience of the group (this is in contrast to other models of cognition where an individual changes his beliefs to become more consistent with his own experience only). The random element introduces a source of noise that enables exploration of the solution space. The search then becomes more directed after a few iterations as the swarm starts to concentrate on more favorable regions.

This type of search is much more efficient than scanning or gradient-based search methods. It is similar to genetic algorithms (GA) in that it can be used for discontinuous and noisy solution spaces since it only requires an evaluation of the objective function at each particle position. However, unlike the chromosome string representation of potential solutions used in GA, the PSO particles do not undergo cross-over or mutation operations, they just travel to a different position, calculate the solution at that position, and compare it with their own and global previous best positions in order to update their velocity vectors. The evolution of good solutions is stable in PSO because of the way solutions are represented (e.g., small changes in the representation result in small changes in the solution, which results in improved convergence and update properties compared to GA).

Figure 6A:
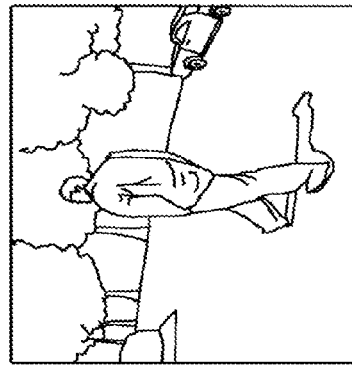
FIG. 6A is an illustration of three original input images.
Figure 6A:
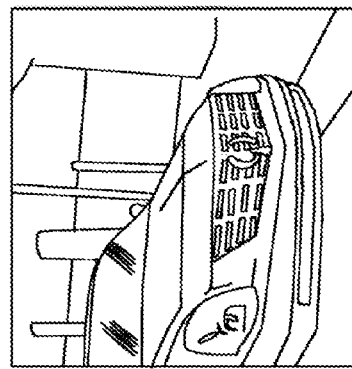
Figure 6A:
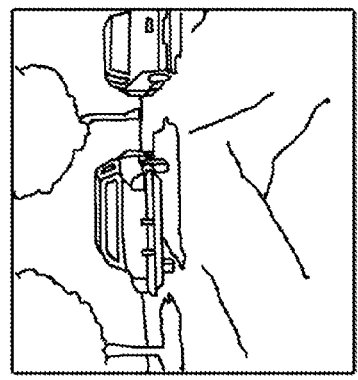
Figure 6B:
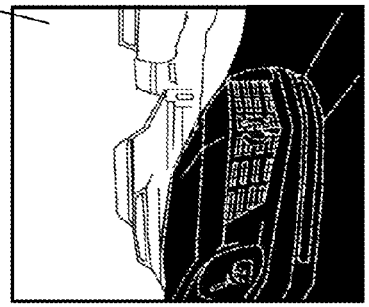
FIG. 6B is an illustration of three mixtures of the three original input images depicted in FIG. 6A.
Figure 6B:
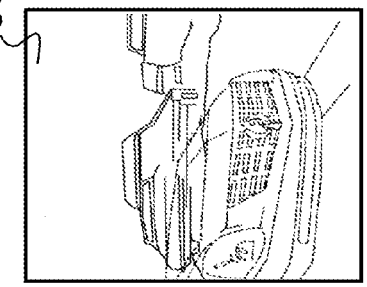

In the first demonstration of cognitive signal-extraction (separation), three image mixtures were formed from three input images. FIG. 6A illustrates the three input images, where the first image 600 contains a pedestrian, the second image 602 contains a front end of a vehicle, and the third image 604 contains a parking lot with vehicles therein. The random mixing matrix was adjusted to make the first image 600 (pedestrian image) coefficient very small in the mixtures to make the problem more challenging. FIG. 6B illustrates the mixed images 606, each of which include a plurality of signals (each of the original input images).

Figure 7:
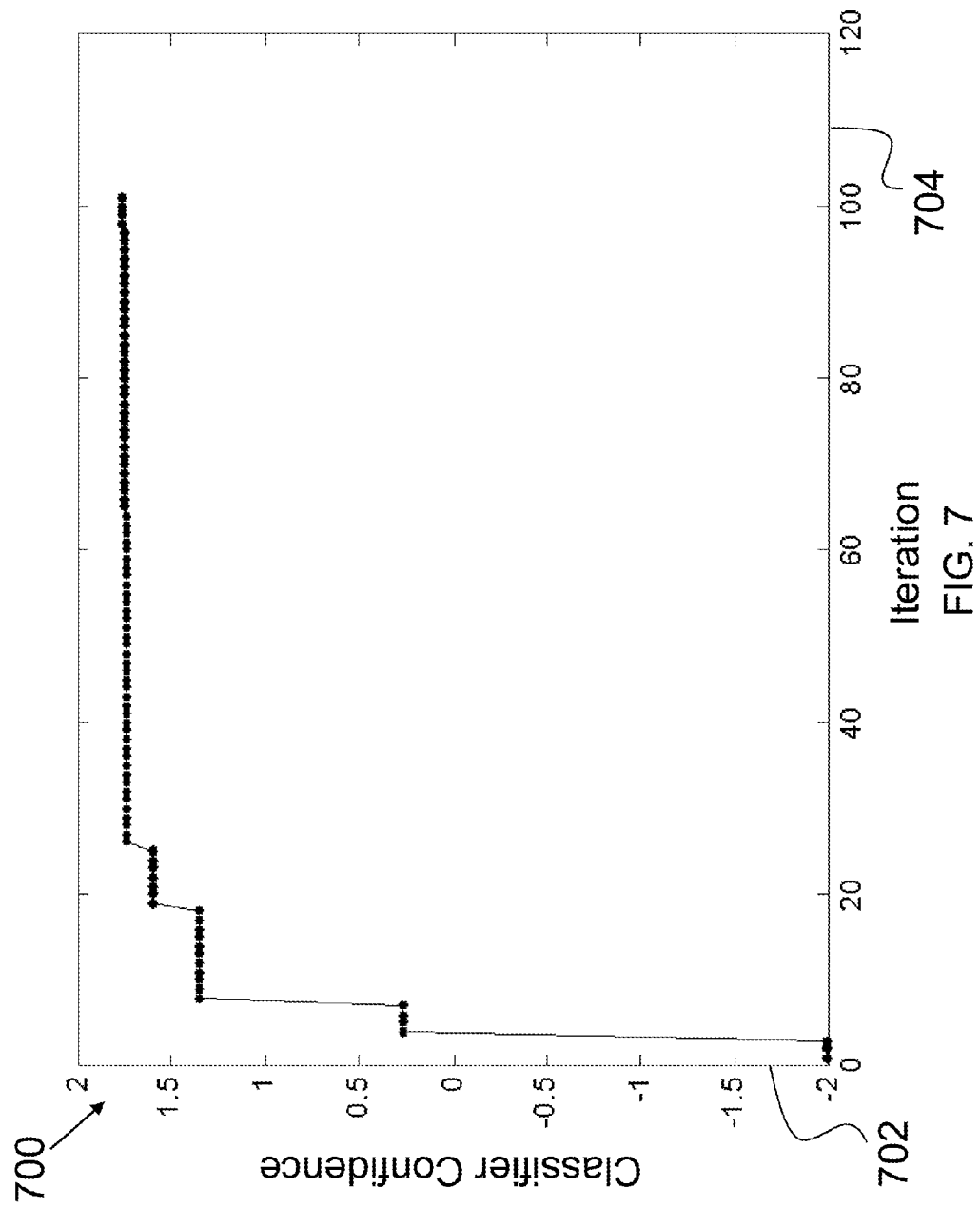
FIG. 7 is a graph illustrating classifier confidence as a function of the number of iterations for a three-mixture cognitive signal separation demonstration using particle swarm optimization (PSO) as an optimizer and a pedestrian classifier.

A PSO swarm containing twenty particles was used to maximize the confidence level of the pedestrian classifier by adjusting the parameters of a three-element demixing vector. FIG. 7 illustrates a plot graph 700 of the classifier confidence 702 versus swarm iteration number 704. As shown in FIG. 7, the confidence level is initially very low. The confidence level then increases as the PSO swarm finds a set of parameters which extracts the pedestrian image from the mixtures. Convergence was reached after thirty swarm iterations for a total of 600 classifier evaluations. The classifier confidence range is −2 to +2, with 2 being the highest confidence that the input is a pedestrian. The PSO optimizer maximized classifier confidence after thirty iterations using twenty particles.

Figure 8A:
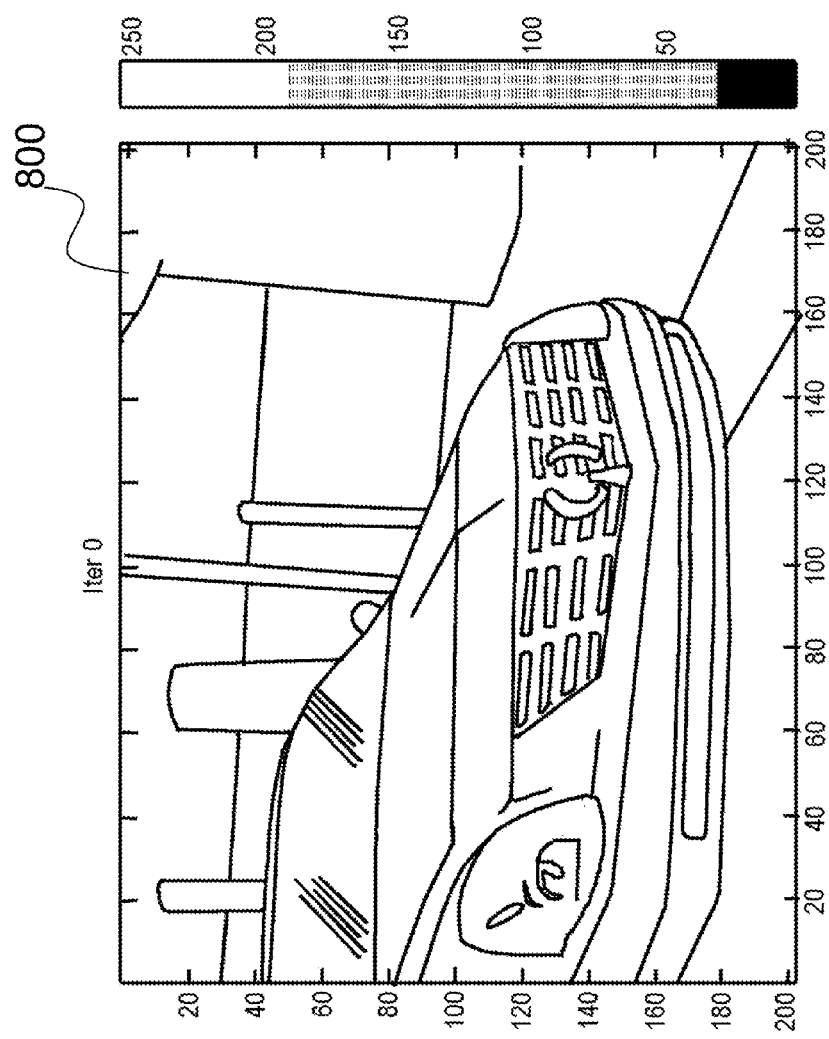
FIG. 8A is an illustration of an output of the cognitive signal processing system at initialization for a mixture separation demonstration, in which the mixtures contain three images and in which the classifier is a pedestrian detection classifier.
Figure 8B:
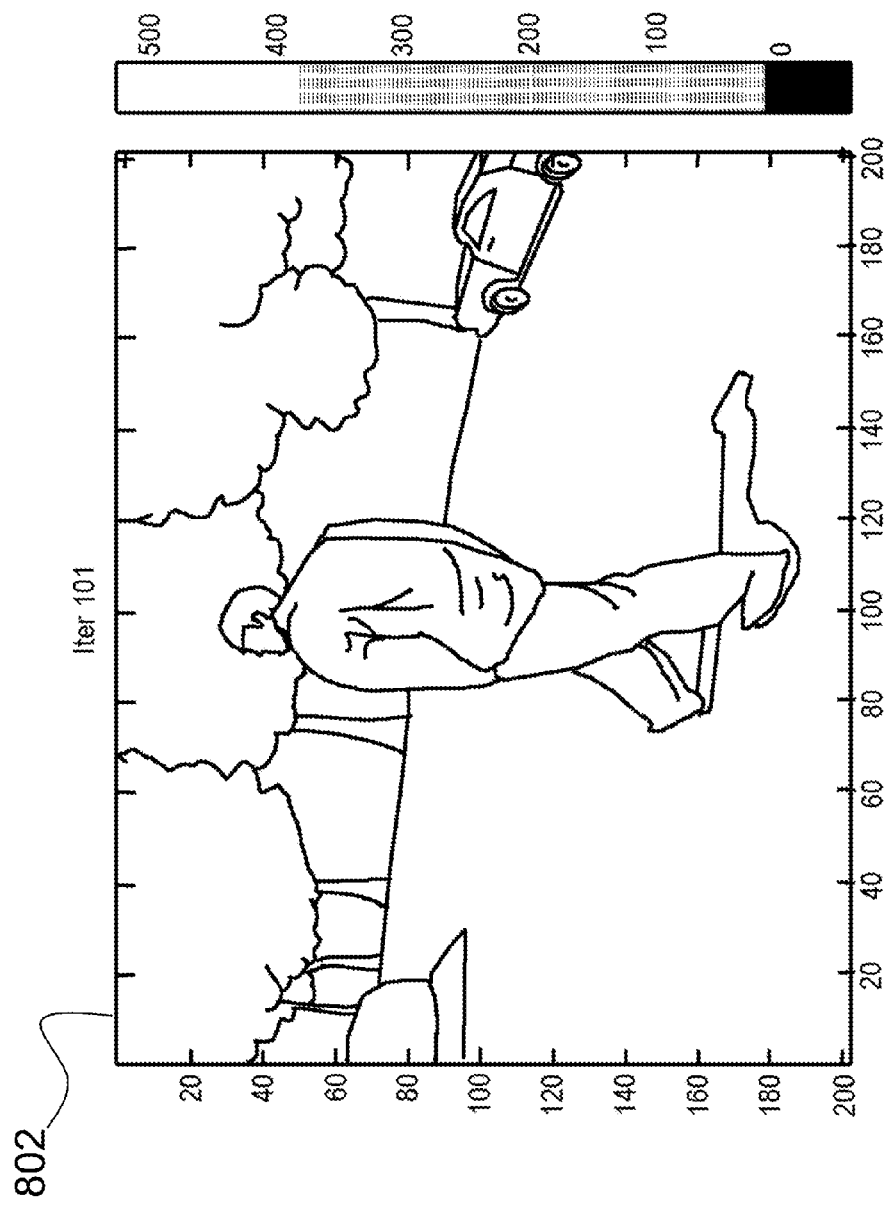
FIG. 8B is an illustration of the output of the cognitive signal processing system after convergence for the mixture separation demonstration, showing extraction of the pedestrian.
Figure 8C:
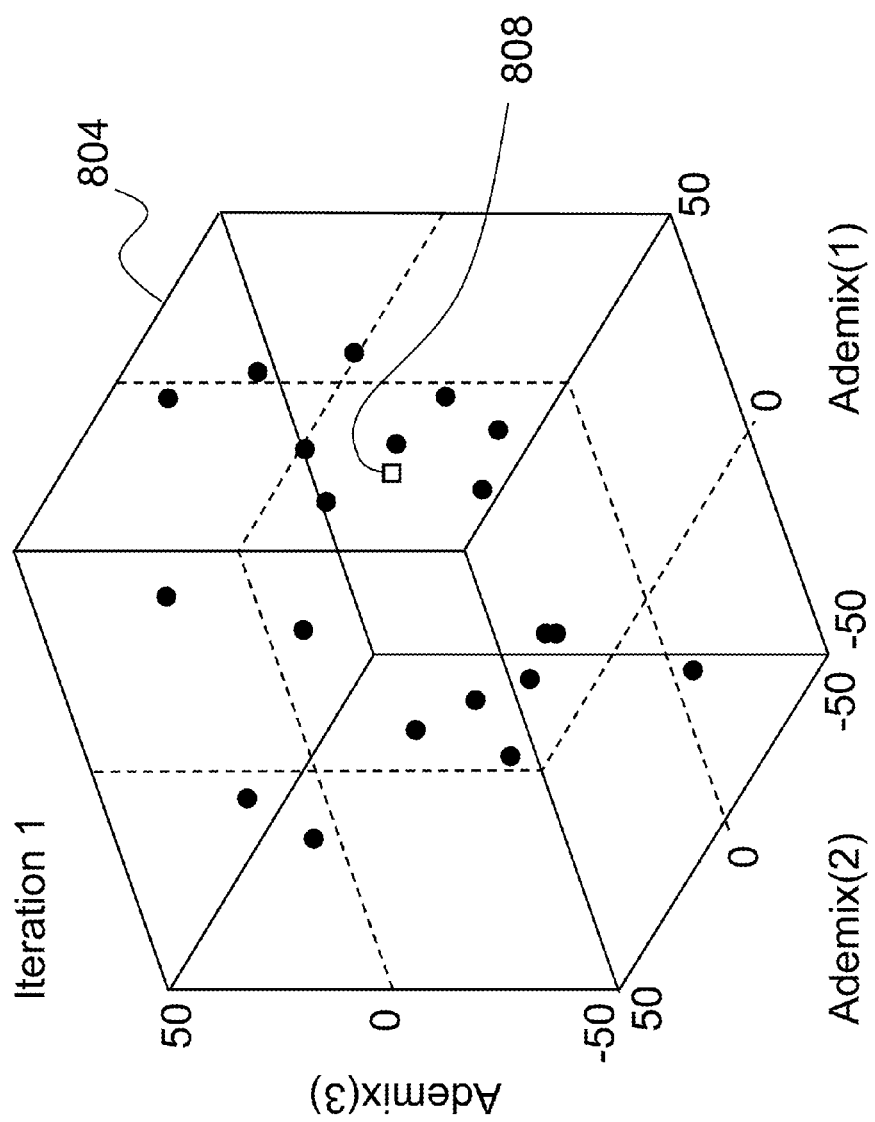
FIG. 8C is a graph illustrating the PSO swarm states of FIG. 8A in a three-dimensional (3D) demixing parameter space, with a best solution of a previous iteration being plotted as a square.

FIG. 8A illustrates an initial output 800 of the cognitive signal processing (separation) system. The initial output 800 illustrates an image prior to any iterations of the PSO swarm. Further, FIG. 8B illustrates the converged output 802 of the system after 101 iterations of the PSO swarm. As illustrated by FIGS. 8A and 8B, the system successfully extracted the pedestrian image (i.e., converged output 802) hidden in the signal mixtures. FIG. 8C is a plot graph 804 that illustrates the PSO swarm positions in the three-dimensional (3D) demixing parameter space (i.e., solution space) that correspond to the signal mixture of FIG. 8A. Additionally, FIG. 8D is a plot graph 806 illustrating the PSO swarm positions in the 3D solution space that correspond to the signal mixture of FIG. 8B. As depicted in both FIGS. 8C and 8D, the best solutions in each of the previous iterations are plotted as boxes 808.

Figure 9A:
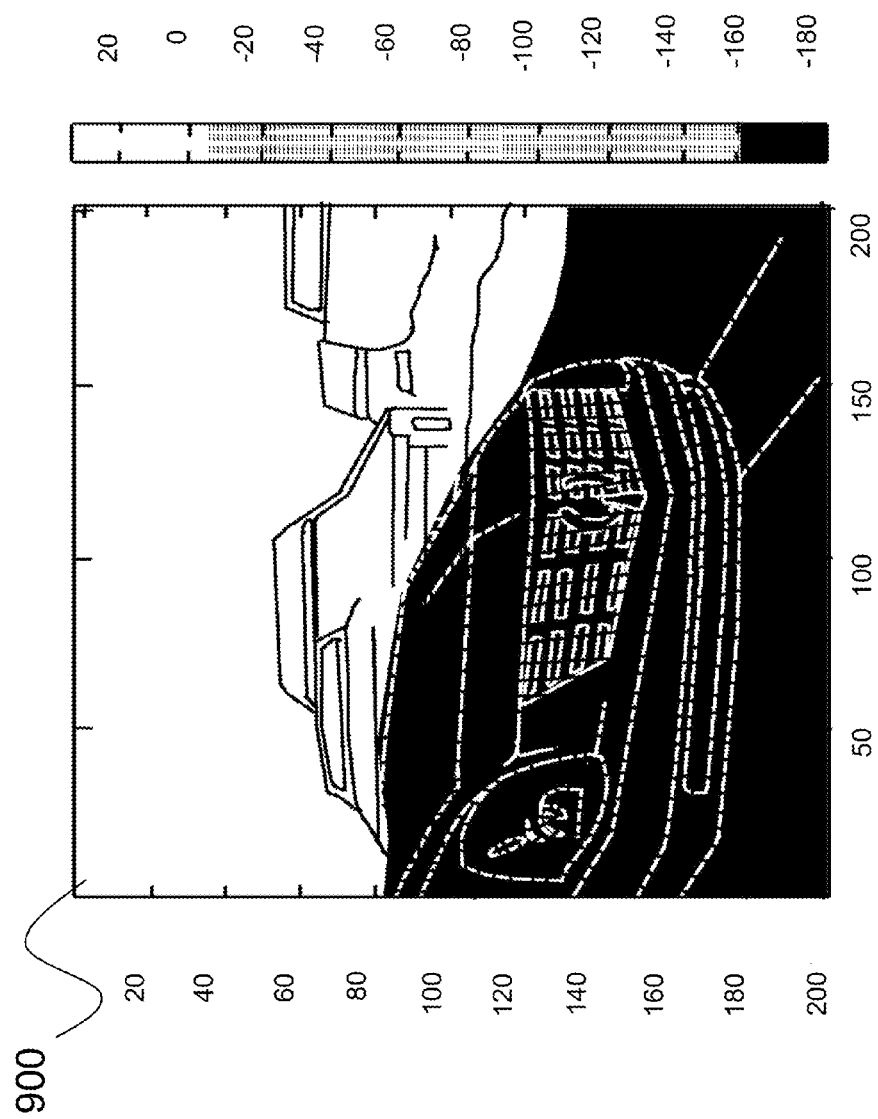
FIG. 9A is an illustration of a seven-image mixture according to the present invention.
Figure 9B:
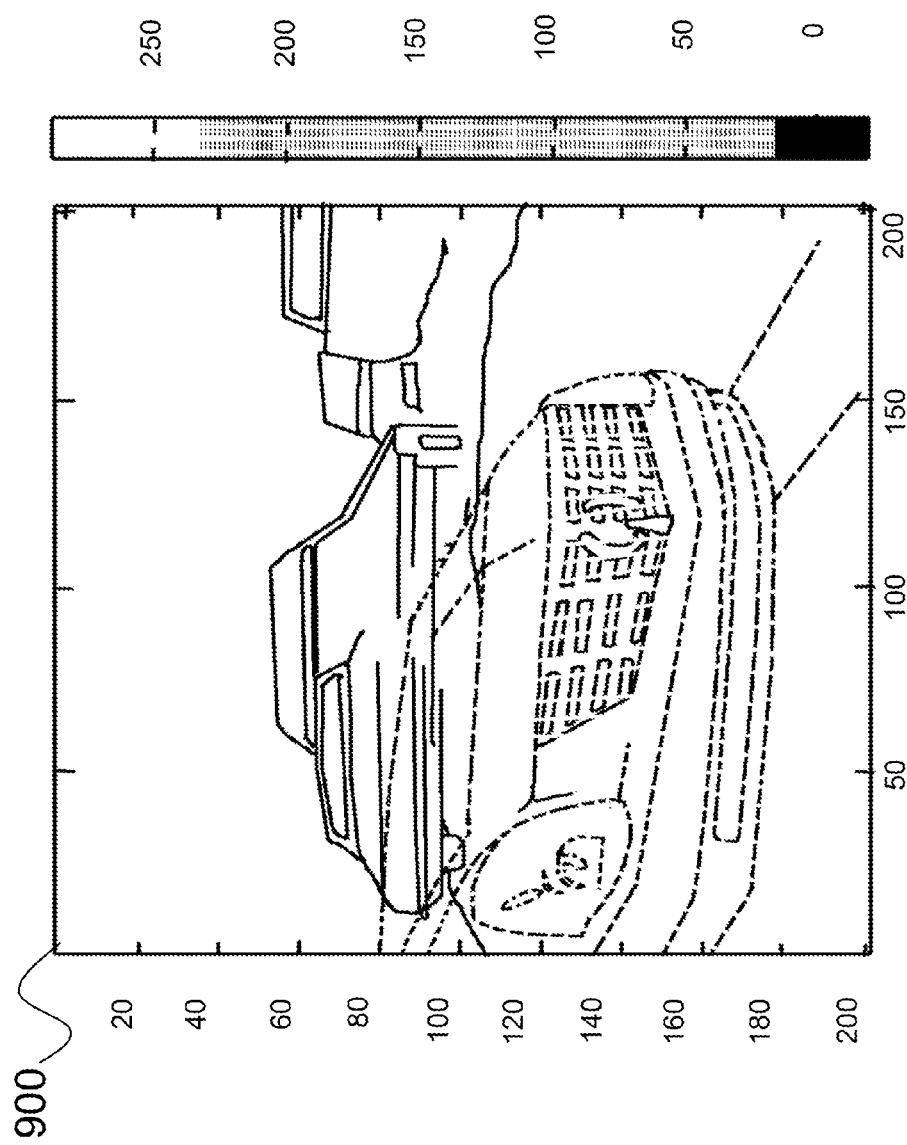
FIG. 9B is an illustration of a seven-image mixture according to the present invention.
Figure 9C:
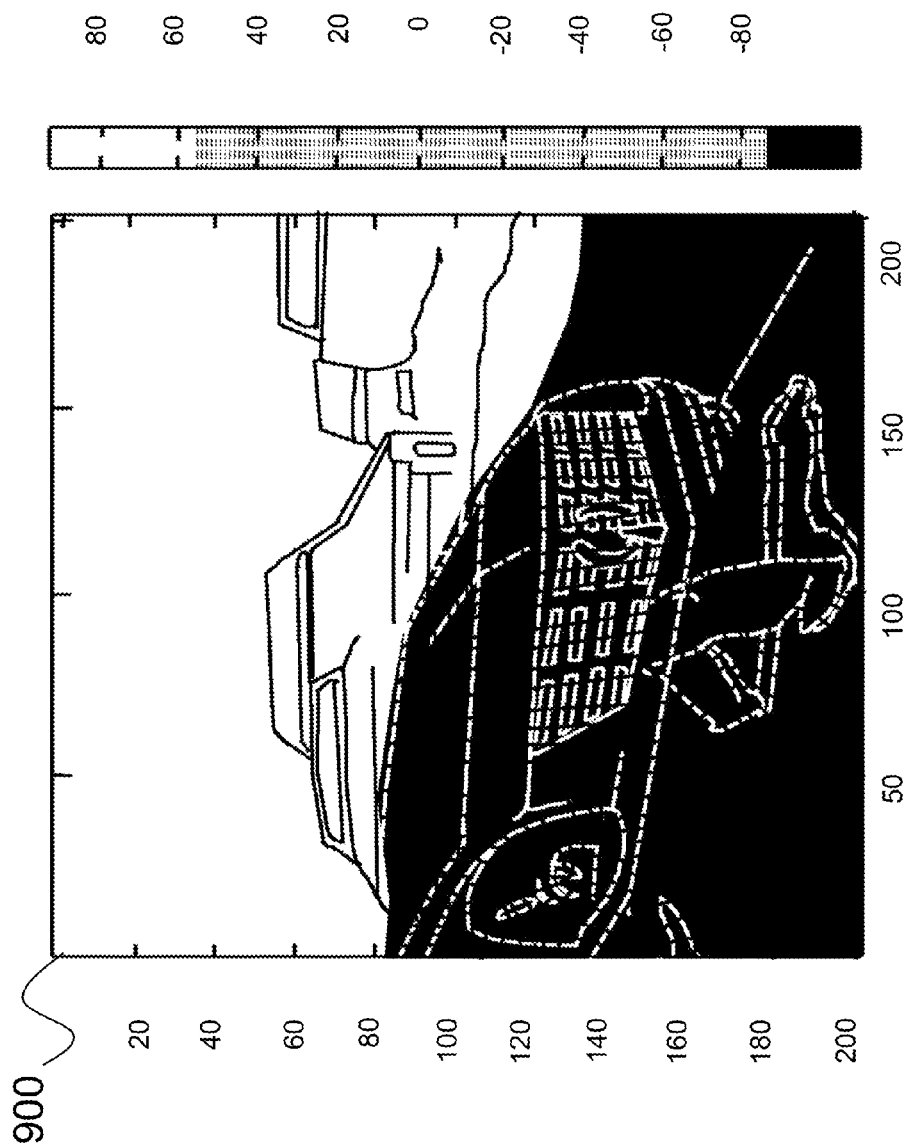
FIG. 9C is an illustration of a seven-image mixture according to the present invention.

In a second demonstration of cognitive signal separation, seven-image mixtures were formed from seven input images, one of which contained a pedestrian. For illustrative purposes, three of the seven-image mixtures 900 are illustrated in FIGS. 9A through 9C. The random mixing matrix was again adjusted to make the pedestrian image coefficient very small in the mixtures to make the problem more challenging. A PSO swarm containing 200 particles was used to maximize the confidence level of the pedestrian classifier by adjusting the parameters of a three-element demixing vector.

Figure 10:
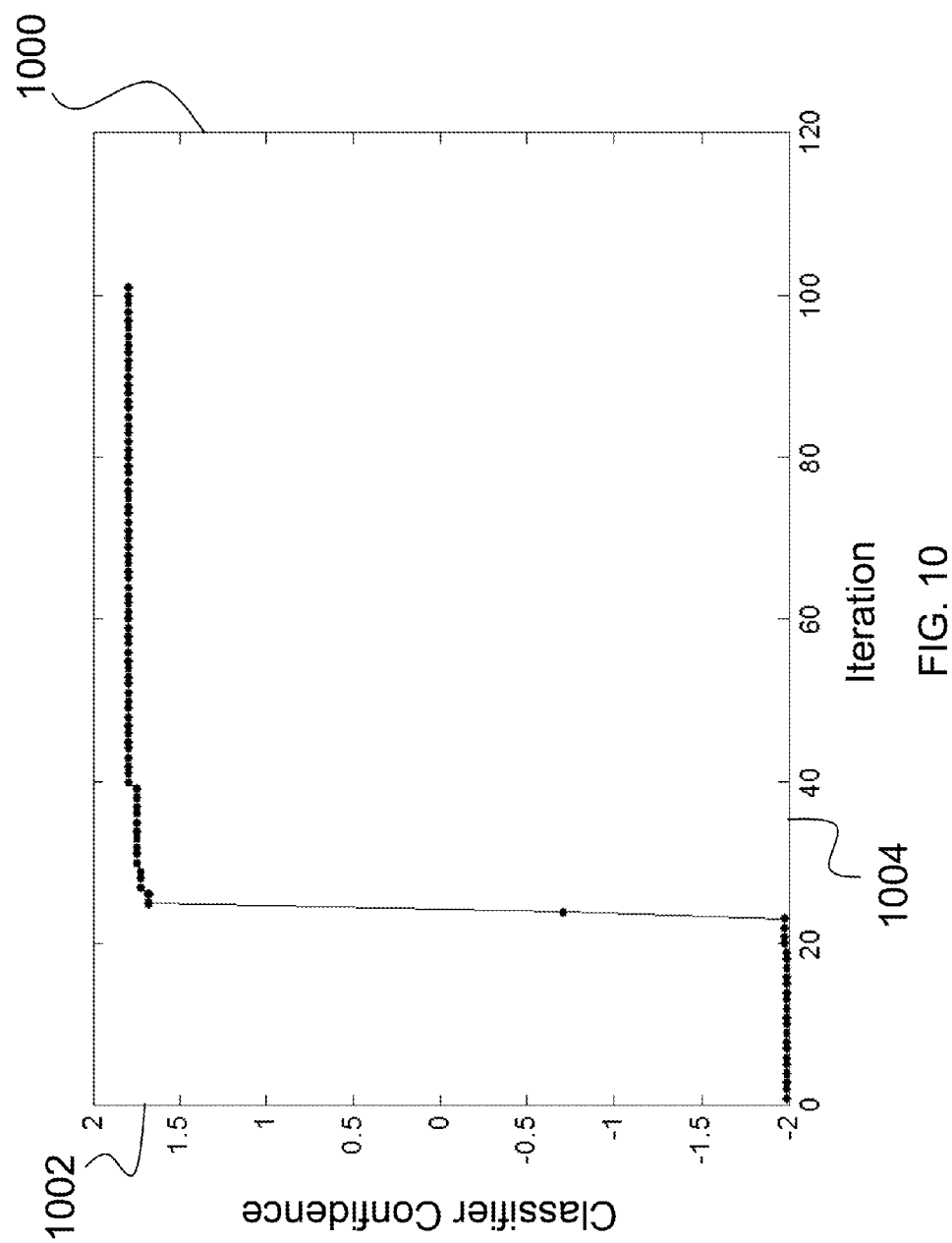
FIG. 10 is a graph illustrating classifier confidence as a function of the number of iterations for a seven-image mixture cognitive signal separation using PSO as the optimizer and a pedestrian classifier.

FIG. 10 is a plot 1000 of the classifier confidence 1002 as a function of the swarm iteration number 1004 for the seven-mixture cognitive signal separation demonstration using particle swarm optimization (PSO) as the optimizer and the pedestrian classifier. As illustrated, the initial pedestrian classifier confidence is again very low. The classifier confidence level then increases as the PSO swarm finds a set of parameters which extracts the pedestrian image from the mixtures. Convergence was again reached after thirty swarm iterations for a total of 6000 classifier evaluations.

The classifier confidence range is −2 to +2, with 2 being the highest confidence that the input is a pedestrian. The PSO optimizer maximized classifier confidence after thirty iterations using 200 particles. It should be noted that the number of iterations for convergence was the same as the three-mixture demonstration, but the convergence was more abrupt.

Figure 11A:
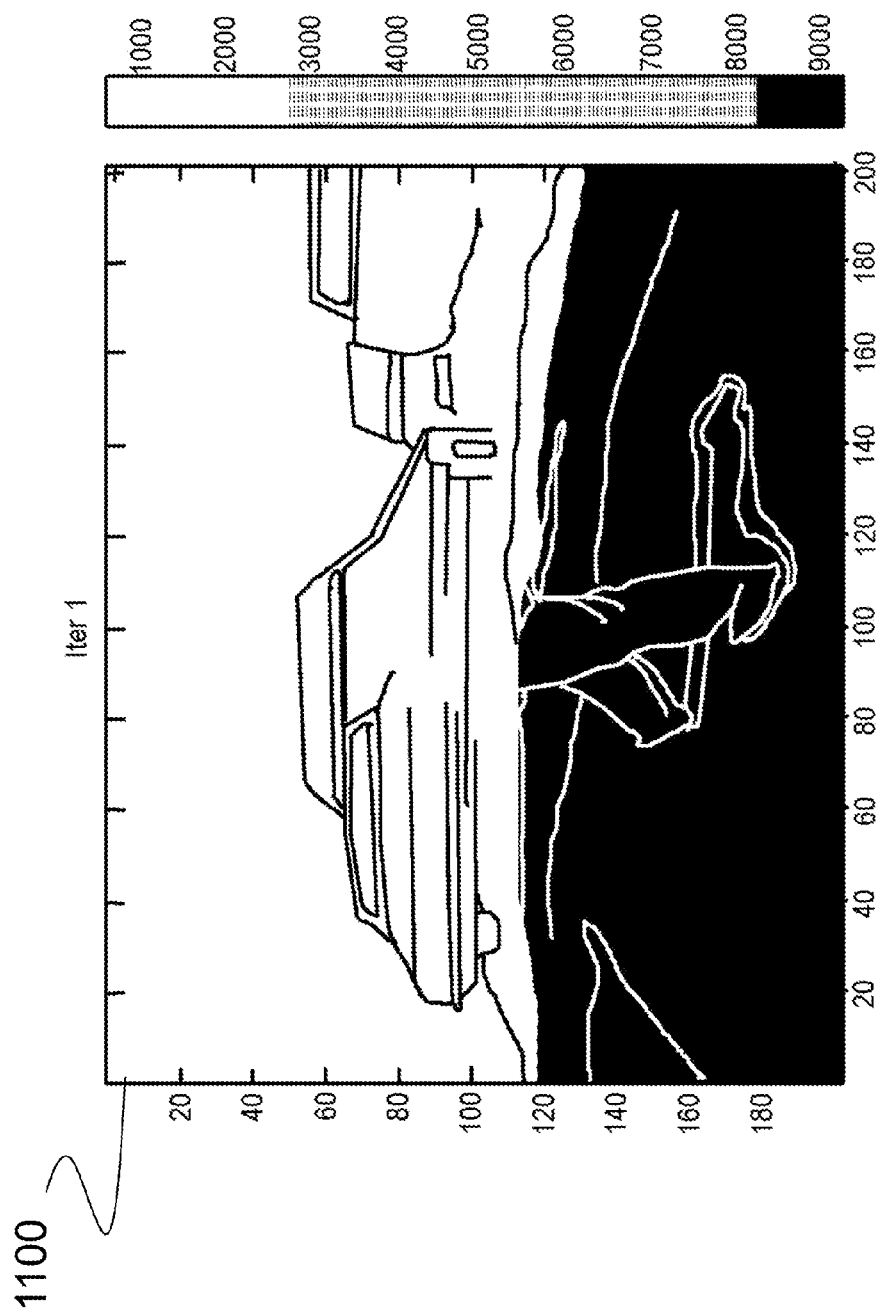
FIG. 11A is an illustration of an output of the cognitive signal processing system at initialization for the seven-mixture demonstration.
Figure 11B:
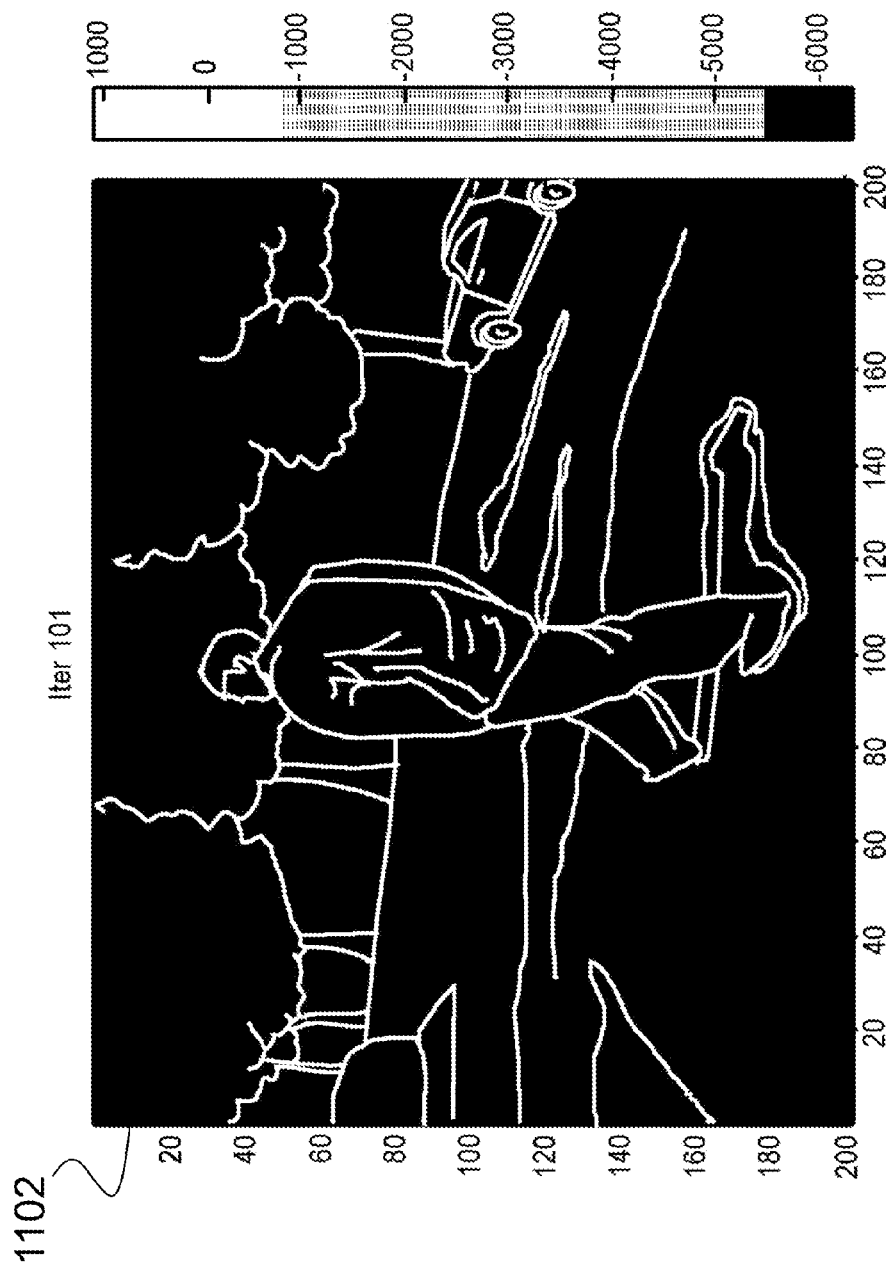
FIG. 11B is an illustration of the output of the cognitive signal processing system after convergence for the seven-mixture demonstration, showing extraction of the pedestrian.
Figure 11C:
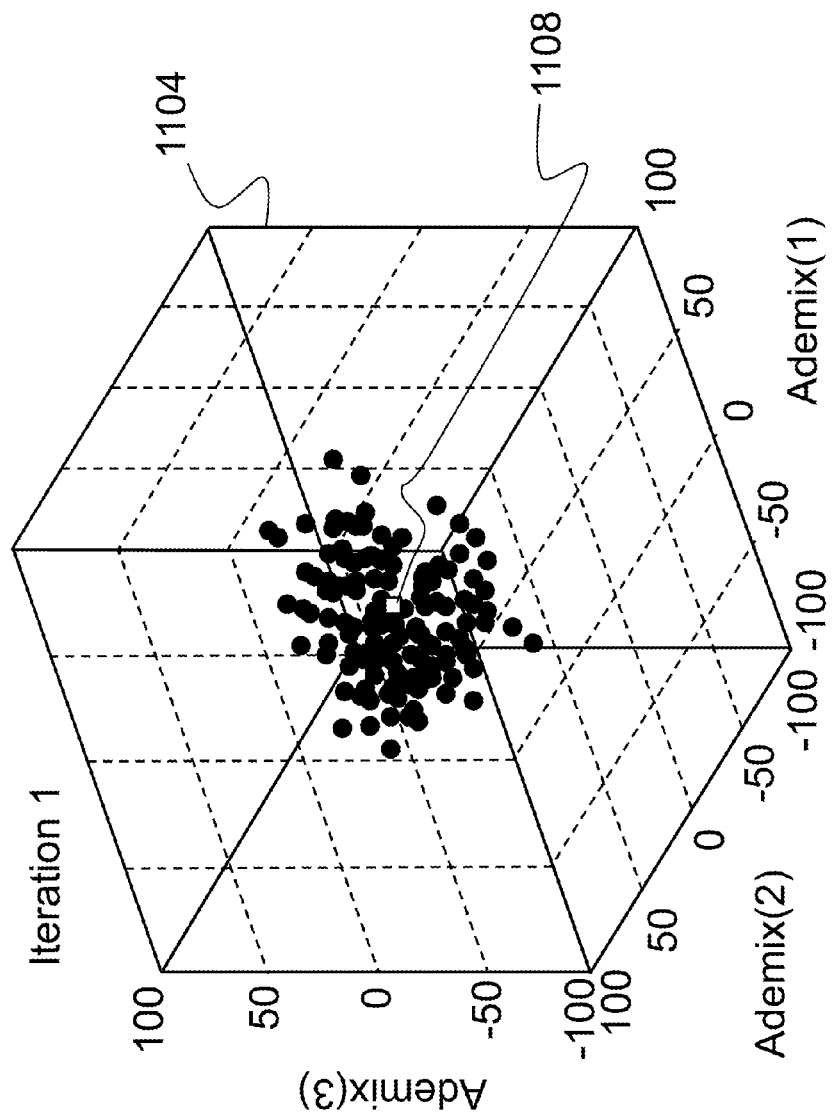
FIG. 11C is a graph illustrating the PSO swarm states of FIG. 11A in a seven-dimensional (7D) demixing parameter space projected into the subspace of the first three demixing parameters, with the best solutions of the previous iterations being plotted as a square.
Figure 11D:
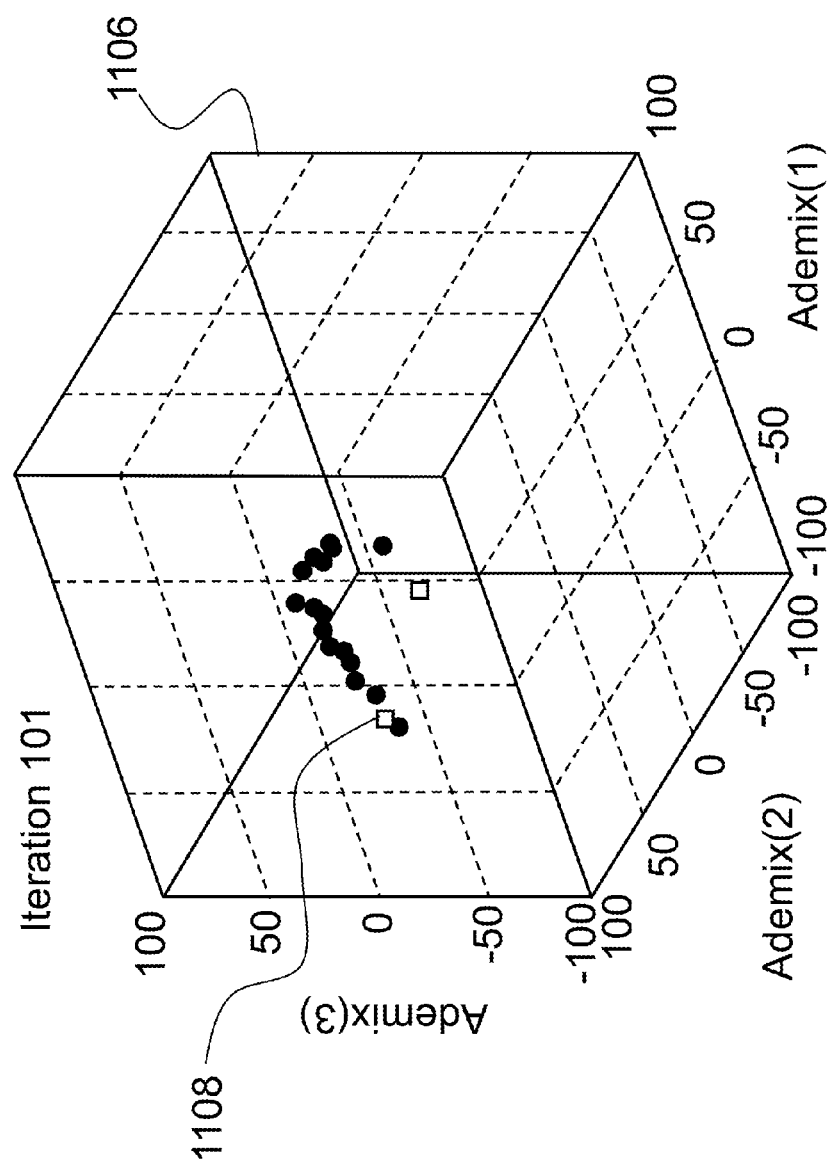
FIG. 11D is a graph illustrating the PSO swarm states of FIG. 11B in a 7D demixing parameter space projected into the subspace of the first three demixing parameters, with the best solutions of the previous iterations being plotted as squares.

FIG. 11A illustrates an initial output 1100 of the cognitive signal separation system. Alternatively, FIG. 11B illustrates a converged output 1102 of the system. As show in FIGS. 11A and 11B, the system successfully extracted the pedestrian image (the converged output 1102) hidden in the signal mixtures. Projections of the corresponding PSO swarm positions into a three-dimensional subspace of the seven-dimensional solution space are illustrated as plots 1104 and 1106 in FIGS. 9C and 9D, respectively. In this case the system found the negative of the pedestrian image buried in the mixtures. This was not unexpected since the pedestrian classifier response is identical for an image and its negative. The best solutions in each of the previous iterations are plotted as squares 1108.

What is claimed is:

1. A system for processing signal mixtures, comprising:
a processor;
a computer readable medium;
a signal fusion module, the signal fusion module having a set of signal fusion parameters and being configured to receive a plurality of signals and use the signal fusion parameters to fuse the signals to output a fused signal;
a classification module, the classification module being configured to receive the fused signal and recognize words or objects encoded in the fused signal to classify the words or objects encoded in the fused signal, with the classification having a confidence level; and
an optimization module, the optimization module being configured in a feedback loop to utilize the words or objects encoded in the fused signal to adjust the set of signal fusion parameters to optimize the confidence level of the classification, thereby optimizing a fusion of the plurality of signals as a fused signal.

2. The system as set forth in claim 1, wherein upon the classifier confidence level reaching a predetermined threshold, the signal processing module is configured to output the fused signal.

3. The system as set forth in claim 2, wherein the optimization module is configured to identify the signal fusion parameters that optimize the confidence level of the classification using a technique selected from a group consisting of a genetic algorithm, particle swarm optimization, and an optimization algorithm.

4. A computer program product for signal processing, the computer program product comprising computer-readable instruction means stored on a non-transitory computer-readable medium that are executable by a computer for causing the computer to perform operations of:
receiving a plurality of signals and using a set of signal fusion parameters to fuse the signals to output a fused signal;
receiving the fused signal and recognizing words or objects encoded in the fused signal to classify the words or objects encoded in the fused signal, with the classification having a confidence level; and
utilizing, in a feedback loop, the words or objects encoded in the fused signal to adjust the set of signal fusion parameters to optimize the confidence level of the classification, thereby optimizing a fusion of the plurality of signals as a fused signal.

5. The computer program product as set forth in claim 4, wherein upon the confidence level reaching a predetermined threshold, further comprising instruction means for causing the computer to output the fused signal.

6. The computer program product as set forth in claim 5, further comprising instruction means for causing the computer to identify the set of signal fusion parameters that optimize the confidence level of the classification using a technique selected from a group consisting of a genetic algorithm, particle swarm optimization, and an optimization algorithm.

7. A computer-implemented method for signal processing, comprising acts of:
receiving a plurality of signals and using a set of signal fusion parameters to fuse the signals to output a fused signal;
receiving the fused signal and recognizing words or objects encoded in the fused signal to classify the words or objects encoded in the fused signal, with the classification having a confidence level; and
utilizing, in a feedback loop, the words or objects encoded in the fused signal to adjust the set of signal fusion parameters to optimize the confidence level of the classification, thereby optimizing a fusion of the plurality of signals as a fused signal.

8. The method as set forth in claim 7, further comprising an act of outputting the fused signal when the confidence level reaches a predetermined threshold.

9. The method as set forth in claim 8, further comprising an act of identify the signal fusion parameters that optimize the confidence level of the classification using a technique selected from a group consisting of a genetic algorithm, particle swarm optimization, and an optimization algorithm.

\* \* \* \* \*